United States Patent
Guering

(10) Patent No.: US 7,156,344 B1
(45) Date of Patent: Jan. 2, 2007

(54) LONG-HAUL AIRPLANE

(75) Inventor: Bernard Guering, Montrabe (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 11/372,151

(22) Filed: Mar. 10, 2006

(30) Foreign Application Priority Data

Jun. 2, 2005 (FR) .................. 05 05577

(51) Int. Cl.
*B64D 11/00* (2006.01)

(52) U.S. Cl. .................................. 244/118.5

(58) Field of Classification Search ............. 244/118.5, 244/118.6

See application file for complete search history.

(56) References Cited

U.S. PATENT DOCUMENTS

| | | | | |
|---|---|---|---|---|
| 3,784,989 A | * | 1/1974 | LeGrand | 5/9.1 |
| 4,589,612 A | * | 5/1986 | Halim | 244/118.6 |
| 5,372,339 A | * | 12/1994 | Morgan | 244/118.5 |
| 5,784,836 A | | 7/1998 | Ehrick | |
| 5,875,997 A | | 3/1999 | Al-Sabah | |
| 6,056,239 A | * | 5/2000 | Cantu et al. | 244/118.6 |
| 6,073,883 A | * | 6/2000 | Ohlmann et al. | 244/118.5 |
| 6,152,400 A | * | 11/2000 | Sankrithi et al. | 244/118.5 |
| 6,182,926 B1 | * | 2/2001 | Moore | 244/118.5 |
| 6,290,181 B1 | * | 9/2001 | Gadd et al. | 244/171.9 |
| 6,305,645 B1 | * | 10/2001 | Moore | 244/118.5 |
| 6,464,169 B1 | * | 10/2002 | Johnson et al. | 244/118.5 |
| 6,520,451 B1 | | 2/2003 | Moore | |
| 6,616,098 B1 | * | 9/2003 | Mills | 244/118.5 |
| 6,848,654 B1 | * | 2/2005 | Mills et al. | 244/118.5 |
| 7,077,360 B1 | * | 7/2006 | Jacob | 244/118.5 |
| 2002/0033432 A1 | * | 3/2002 | Mikosza | 244/118.6 |
| 2003/0029967 A1 | * | 2/2003 | Mills | 244/118.5 |
| 2003/0141413 A1 | * | 7/2003 | Brasseur et al. | 244/118.5 |
| 2003/0189132 A1 | * | 10/2003 | Brady et al. | 244/118.5 |
| 2003/0218095 A1 | * | 11/2003 | Saint Jalmes | 244/118.5 |
| 2004/0195451 A1 | * | 10/2004 | Bentley et al. | 244/118.6 |
| 2005/0001097 A1 | * | 1/2005 | Saint-Jalmes | 244/118.6 |
| 2005/0001098 A1 | * | 1/2005 | Saint-Jalmes | 244/118.6 |
| 2005/0023413 A1 | * | 2/2005 | Saint-Jalmes | 244/118.6 |
| 2005/0178904 A1 | * | 8/2005 | Mills | 244/118.5 |
| 2005/0211837 A1 | * | 9/2005 | Saint-Jalmes et al. | 244/118.6 |
| 2006/0000947 A1 | * | 1/2006 | Jacob | 244/118.6 |
| 2006/0054741 A1 | * | 3/2006 | Mills et al. | 244/118.5 |
| 2006/0054742 A1 | * | 3/2006 | Druckman et al. | 244/118.5 |
| 2006/0065783 A1 | * | 3/2006 | Mills | 244/118.6 |
| 2006/0113427 A1 | * | 6/2006 | Saint-Jalmes et al. | 244/118.5 |
| 2006/0124802 A1 | * | 6/2006 | Ritts et al. | 244/118.5 |

FOREIGN PATENT DOCUMENTS

EP 0901963 3/1999

OTHER PUBLICATIONS http://www.boeing.com/commercial/747family/background.html (of Feb. 8, 2002).*
http://www.boeing.com/companyoffices/gallery/images/commercial/747-07.html (Feb. 12, 2002).*
Preliminary Search Report dated Nov. 30, 2005 with English translation.
"A340 Cabin Offers New Levels of Comfort for Passengers and Crew," Aircraft Engineering, Bunhill Publications Ltd. London, GB, vol. 63, No. 12, Dec. 1, 1991, 2-4, XP000238199.

* cited by examiner

*Primary Examiner*—Teri Pham Luu
*Assistant Examiner*—Edward J. Mayle
(74) *Attorney, Agent, or Firm*—Stevens, Davis, Miller & Mosher, LLP

(57) ABSTRACT

A long-haul airplane has a private cabin for the pilots within a storage compartment disposed on a floor below the flight deck. The private cabin is in communication with the flight deck through an opening in the floor.

7 Claims, 4 Drawing Sheets

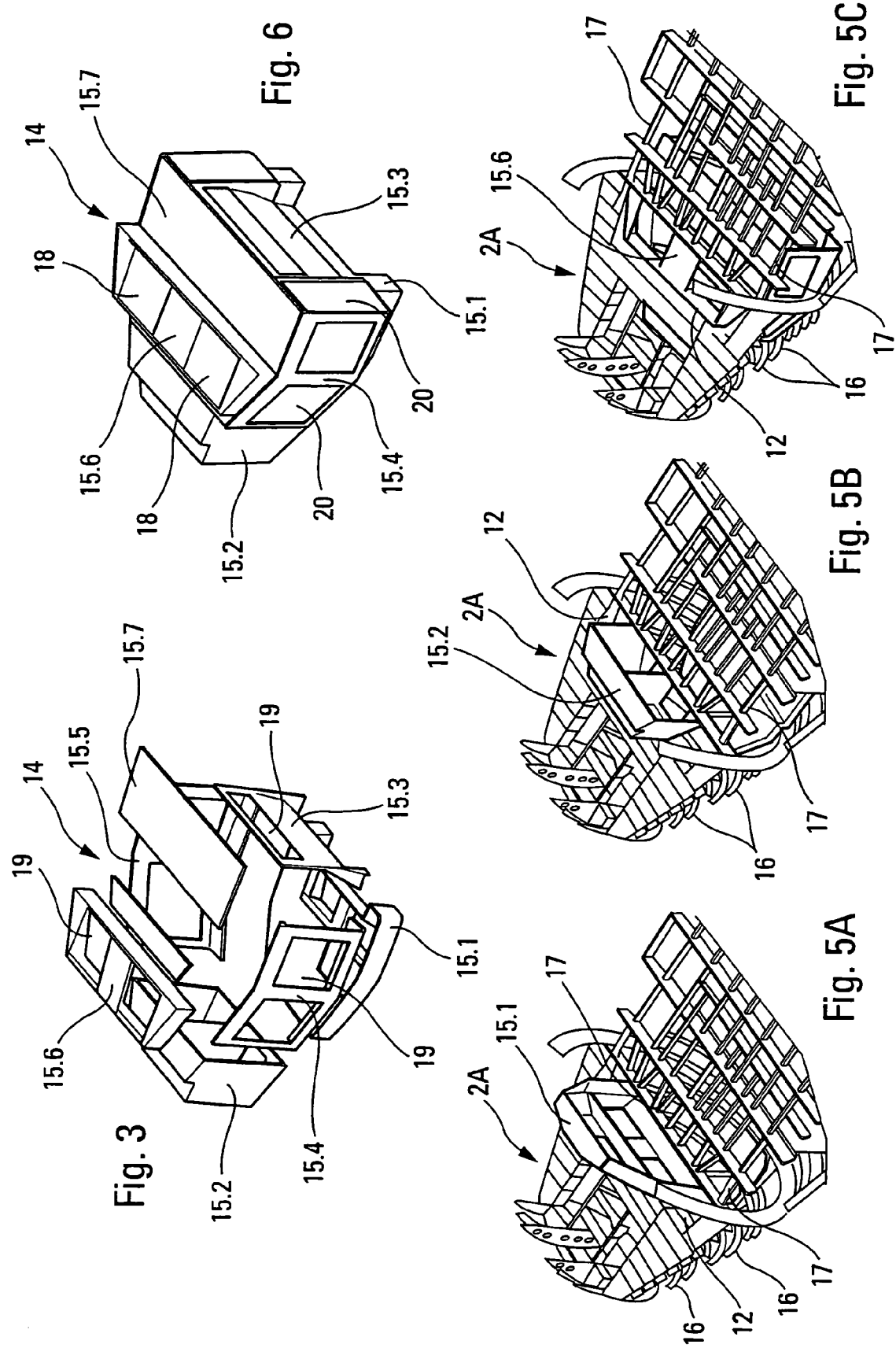

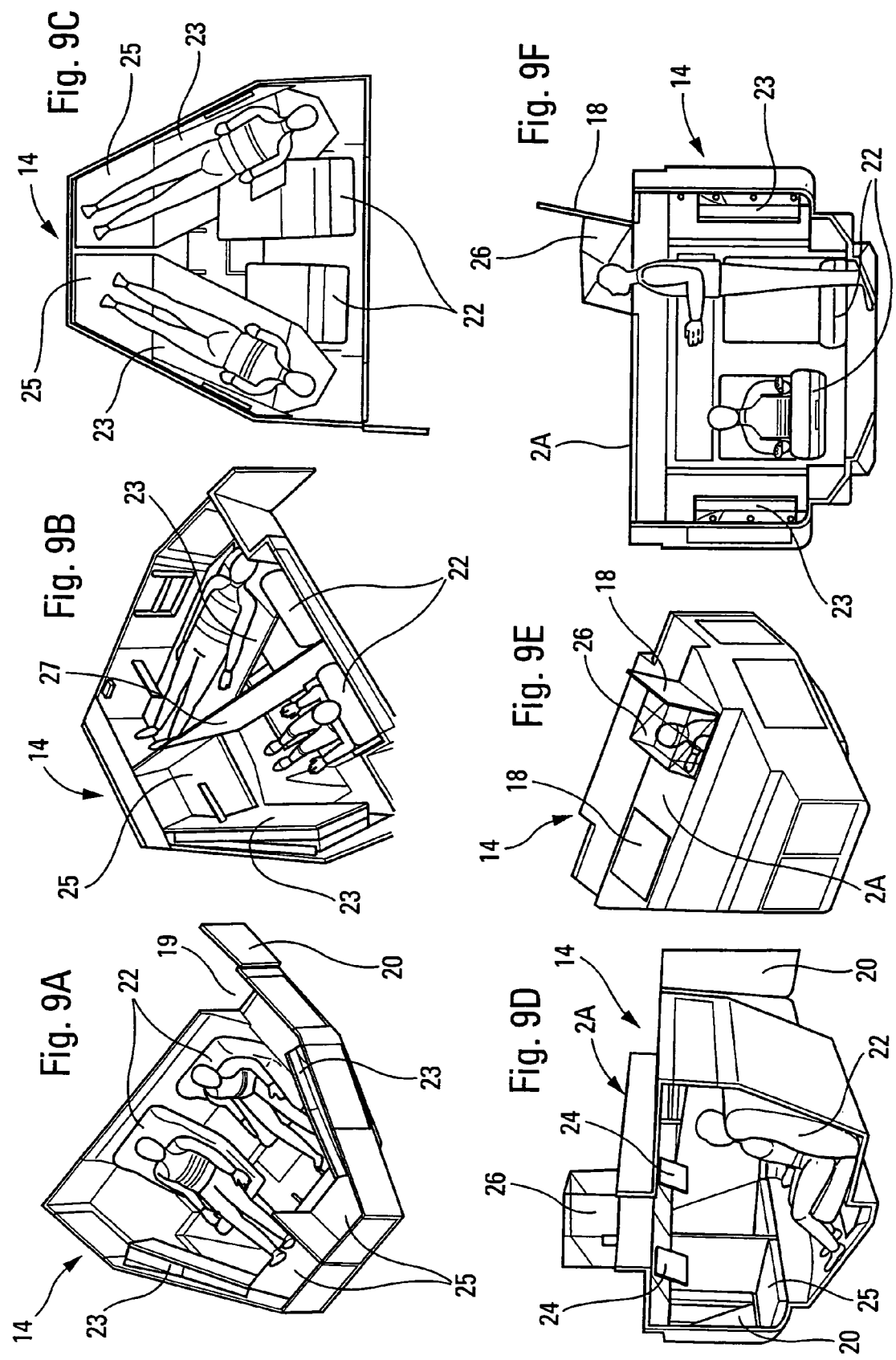

LONG-HAUL AIRPLANE

BACKGROUND OF THE INVENTION

It is known that long-haul airplanes may require two flight crews when the distances they are traveling are particularly long. It is therefore indispensable that they comprise a private rest cabin in which one of said crews—which comprises at least two pilots—may rest while the other crew flies the airplane. As a general rule, such a rest cabin is disposed in a commercial zone, for example behind the cockpit or in the tail of the aircraft, which has the disadvantage of obliging the pilots to pass through the passenger cabin to go from the flight deck to the rest cabin and to return therefrom. In addition, in such a disposition, said rest cabin occupies a portion of said commercial zone, so that a certain number of passenger seats, usually of the order of 6 to 8, are removed in consequence.

The purpose of the present invention is to remedy these disadvantages.

SUMMARY OF THE INVENTION

For this purpose, according to the invention, the long-haul airplane that comprises a private cabin for the pilots and whose flight deck is disposed on a floor below which there is a storage compartment, is noteworthy in that said private cabin is arranged in said storage compartment and is in communication with said flight deck through at least one opening made in said floor.

Thus, said pilots may pass directly from the flight deck into the private cabin, and vice versa, without passing through the passenger cabin. The present invention can therefore be used to isolate all the flight crews from the rest of the aircraft by geographically grouping the pilots' flight function and rest function together. Furthermore, the disposition of the private cabin according to the invention makes it possible to gain volume and seats in the commercial zone, this gain naturally being economically valuable for the airline operating the aircraft.

It will be noted that, in said storage compartment situated beneath the flight deck, there is usually equipment such as batteries, oxygen bottles, the anti-icing system, electric devices, the radar system, etc., so that the presence of the said rest cabin may require the removal or rearrangement of said equipment.

Preferably, to simplify the installation of said private cabin in the storage compartment beneath the flight deck, said private cabin consists of a plurality of individual elements each of which being capable of passing through the said opening in the floor and which are capable of being assembled to one another inside said storage compartment. Evidently, preferably during the assembly of said individual elements, said private cabin is attached to longitudinal rails and/or to transverse frames of the structural portion of the fuselage constituting said storage compartment. Said private cabin is furthermore advantageously attached to the floor of the flight deck. The attachment means used for the attachment of the private cabin inside the storage compartment are preferably of known types allowing certain degrees of liberty, such as, for example, the attachment means with articulated crank arm, elastic block, etc.

To allow the easy passage of said wall elements through said opening in the floor, the latter has an oblong shape, for example at least approximately rectangular. In addition, to prevent weakening the floor of the flight deck, said opening is advantageously transversal relative to the fuselage.

As a result it is advantageous that each of said individual elements be relatively flat and require only an opening of reduced dimensions for it to be inserted into said storage compartment.

Because of the location of said private cabin in the vicinity of the nose of the airplane, the latter may have, in plan view, the at least approximate shape of a trapezium converging toward the front of the airplane.

Advantageously, on its top portion, said private cabin comprises a protrusion blanking off said opening in the floor and forming the continuation of the latter, said protrusion being provided with at least one communication hatch between said flight deck and said private cabin.

In order to allow the inspection and maintenance of the various items of equipment found in said storage compartment, outside said private cabin, and to satisfy the safety standards (for example the requirement for a double emergency evacuation route), each of said individual elements is provided with at least one opening that can be blanked off by a shutter.

Said private cabin is advantageously arranged to allow two people (the pilots) to sit down and lie down side by side with their legs pointing toward the front of said airplane.

DESCRIPTION OF THE DRAWINGS

The figures of the appended drawing will clearly explain how the invention may be embodied. In these figures, identical reference numbers indicate similar elements.

FIG. 3 illustrates, in exploded view, a private cabin for the pilots according to the present invention.

FIGS. 5A, 5B and 5C illustrate three steps of the installation of said private cabin in the storage compartment disposed beneath the flight deck.

FIG. 6 shows, in perspective from above, the private cabin of the invention in the mounted state (outside said storage compartment).

FIGS. 8 and 9A to 9F illustrate various arrangements and uses of the private cabin according to the present invention.

DESCRIPTION OF THE PREFERRED EMBODIMENTS

Figure 1:
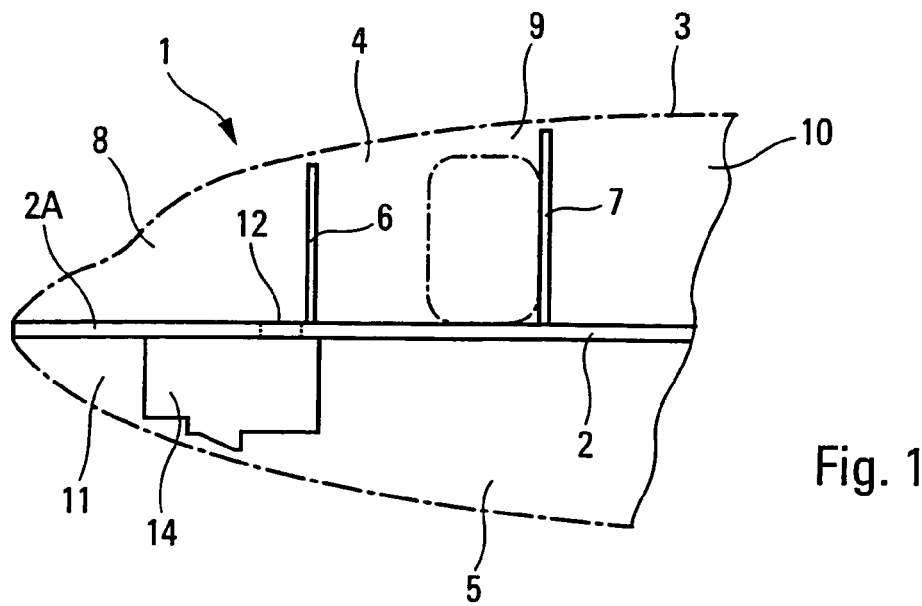
FIG. 1 is a schematic side view of the front of a long-haul airplane according to the present invention.
Figure 2:
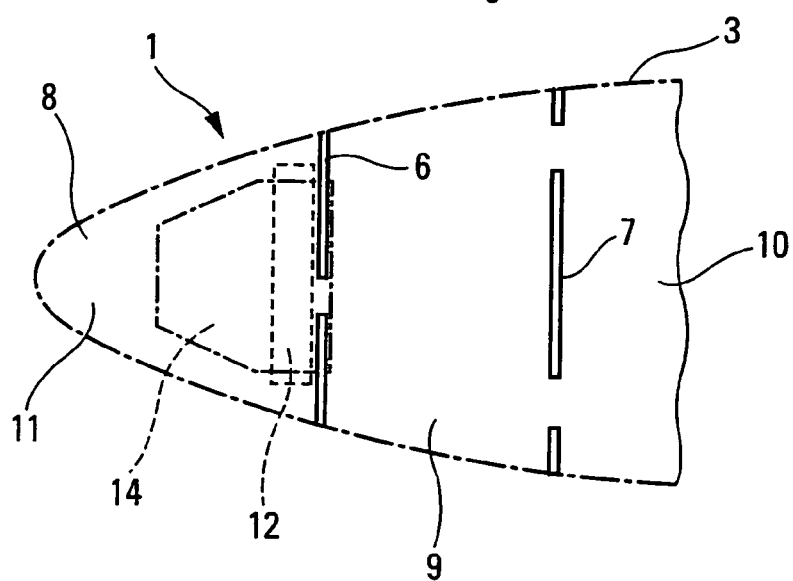
FIG. 2 is a schematic plan view corresponding to FIG. 1.

Schematic FIGS. 1 and 2 show the front 1 of a long-haul airplane. This shows the horizontal longitudinal floor 2 separating the fuselage 3 into an upper space 4 and a lower space 5. In the upper space 4 are arranged, with the aid of partitions 6, 7, the flight deck 8, an entrance 9 and the passenger cabin 10. In the lower space 5 are arranged storage compartments, indicating only the storage compartment 11 disposed beneath the flight deck 8 and separated from the latter by the front portion 2A of the floor 2 forming the floor of said flight deck 8.

Figure 4:
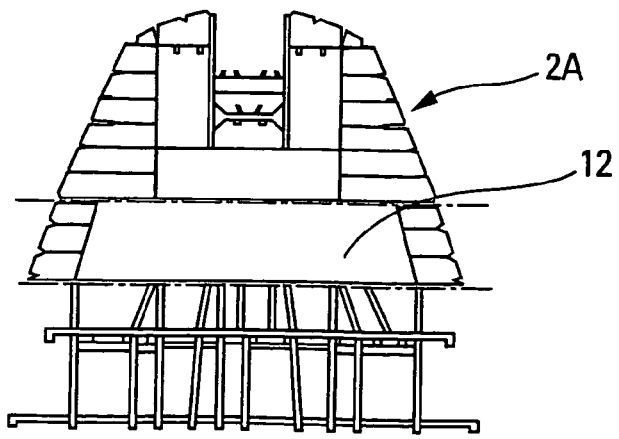
FIG. 4 shows a schematic plan view of the floor of the flight deck of the long-haul airplane of FIGS. 1 and 2.

In the vicinity of the partition 6, separating the flight deck 8 from the entrance 9, the floor 2A of the flight deck 8 comprises an opening 12 establishing a communication passage between the flight deck 8 and the storage compartment 11 through said floor 2A. As can be seen in FIGS. 2 and 4, said opening 12 is oblong and transversal relative to the fuselage 3.

According to the present invention, the long-haul airplane according to the present invention comprises a private cabin 14 arranged in the storage compartment 11 and in communication with the flight deck 8 through said opening 12 made in the floor 2A.

As illustrated in FIG. 3, said private cabin 14 consists of a plurality of individual elements 15 comprising, amongst other things, a bottom element 15.1, a front element 15.2, a rear element 15.3, side elements 15.4 and 15.5 and ceiling elements 15.6 and 15.7. All said individual elements 15 are capable of passing through the opening 12 in the floor 2A and of being assembled to one another inside the storage compartment 11 to form said cabin 14. These individual elements 15 preferably have one or more flat faces.

FIGS. 5A, 5B and 5C show respectively as examples the insertion of the bottom element 15.1, the front element 15.2 and the ceiling element 15.6 into the storage compartment 11 through the opening 12.

Figure 7:
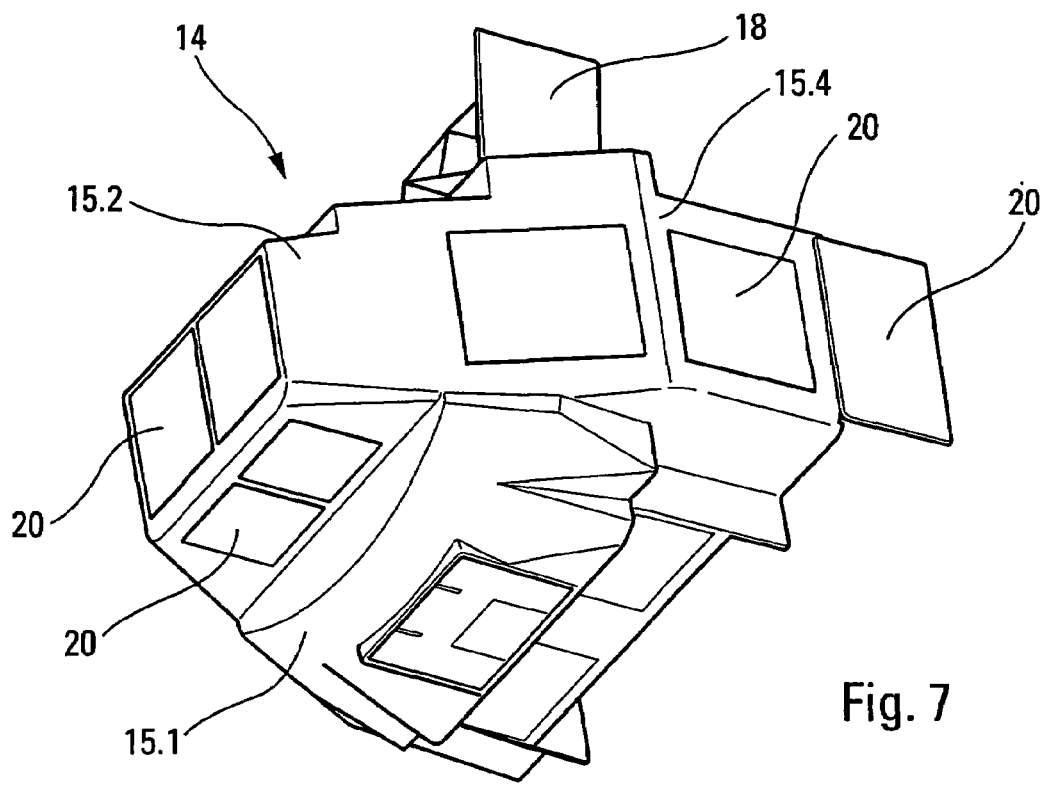
FIG. 7 illustrates, in perspective from below, the private cabin of the invention in the mounted state (outside said storage compartment), the cabin of FIG. 7 being slightly different from that of FIG. 6.

After said elements 15 have been assembled inside the storage compartment 11, the private cabin 14 has the shape illustrated by FIG. 6 or FIG. 7. In addition, at least some of said elements 15 are attached, by any known manner not shown, to frames 16 and to longitudinal beams 17 of the fuselage 3, and/or to the floor 2A, to immobilize the private cabin 14 inside the storage compartment 11.

Once assembled, the private cabin 14 has, in plan view, at least the approximate shape of a trapezium converging toward the front of the airplane, which allows it to best occupy the volume of the storage compartment 11.

As can be seen in FIGS. 5C and 6, the ceiling element 15.6 forms a protrusion for the cabin 14, said protrusion blanking off the opening 12 in the floor 2A and forming the continuation of the latter inside the flight deck 8. In addition, the ceiling element 15.6 comprises two communication hatches 18 (therefore housed in the opening 12), allowing communication between the flight deck 8 and the private cabin 14.

Figure 8:
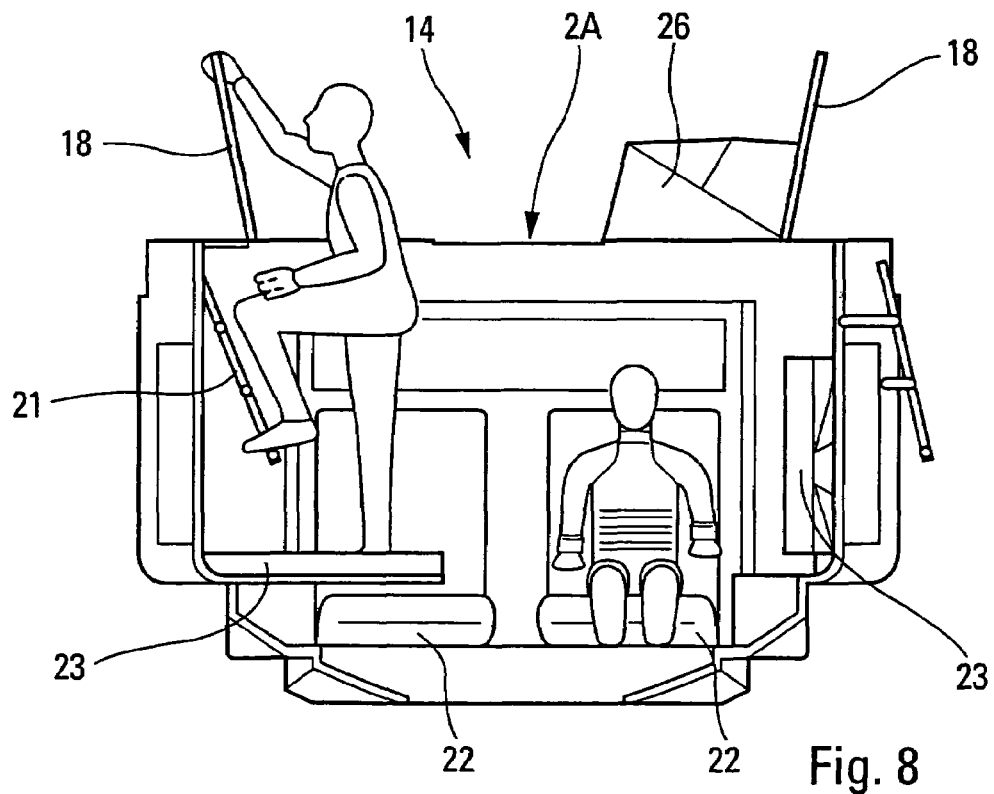

FIG. 8 illustrates schematically the passage of a pilot from the private cabin 14 to the flight deck 8 through a communication hatch 18, with the aid of a ladder 21. Naturally, the passage in the reverse direction is made in similar fashion.

Each individual element 15 is furthermore provided with at least one opening 19 that can be blanked off by a shutter 20, allowing communication between said private cabin 14 and the storage compartment 11.

In the representations of FIGS. 8 and 9A to 9F, the cabin 14 is arranged to receive two persons comfortably (particularly a pilot and a copilot). Accordingly, the arrangement of the cabin 14 may principally comprise two seats 22 disposed side by side and facing toward the front of the long-haul airplane, and two fold-away banquettes 23 that may serve as beds. Thus, such an arrangement allows two persons to sit down and/or lie down side by side with their legs pointing toward the front of the airplane.

Naturally, the private cabin 14 may comprise numerous other convenience arrangements, such as video screens 24, tables 25, foldable cover 26 associated with the hatches 18 of the ceiling element 15.6 to make it possible to increase the height in the cabin 14 level with the hatches 18, movable partition 27, etc. FIGS. 8 and 9A to 9F illustrate some of these arrangements and the various positions that the pilots may take inside the private cabin 14.

The invention claimed is:

1. A long-haul airplane comprising:
   a private cabin for the pilots; and
   a flight deck that is disposed on a floor below which there is a storage compartment, wherein:
   said private cabin is arranged in said storage compartment and is in communication with said flight deck through at least one opening made in said floor, and
   said opening in the floor is oblong shape and transversal relative to the fuselage.

2. A long-haul airplane comprising:
   a private cabin for the pilots; and
   a flight deck that is disposed on a floor below which there is a storage compartment, wherein:
   said private cabin is arranged in said storage compartment and is in communication with said flight deck through at least one opening made in said floor, and
   said private cabin has, in plan view, at least the approximate shape of a trapezium converging toward the front of said airplane.

3. A long-haul airplane comprising:
   a private cabin for the pilots; and
   a flight deck that is disposed on a floor below which there is a storage compartment, wherein:
   said private cabin is arranged in said storage compartment and is in communication with said flight deck through at least one opening made in said floor, and
   said private cabin comprises, on its top portion, a protrusion blanking off said opening in the floor and forming the continuation of the latter, said protrusion being provided with at least one communication hatch between said flight deck and said private cabin.

4. The long-haul airplane as claimed in claim 1, wherein said private cabin comprises a plurality of individual elements each of which is capable of passing through said opening in the floor and which are capable of being assembled to one another inside said storage compartment.

5. The long-haul airplane as claimed in claim 4, wherein each of said individual elements comprises one or more flat faces.

6. The long-haul airplane as claimed in claim 4, wherein each of said individual elements is provided with at least one opening that can be blanked off by a shutter.

7. The long-haul airplane as claimed in claim 2, wherein said private cabin is arranged to allow two people to sit down and lie down side by side with their legs pointing toward the front of said airplane.

* * * * *